(12) United States Patent
Butin et al.

(10) Patent No.: US 9,098,313 B2
(45) Date of Patent: Aug. 4, 2015

(54) RECORDING DISPLAY-INDEPENDENT COMPUTERIZED GUIDANCE

(75) Inventors: Emma Butin, Tel Aviv (IL); Oren Keinan, Netanya (IL)

(73) Assignee: KRYON SYSTEMS LTD., Tel Aviv (IL)

( * ) Notice: Subject to any disclaimer, the term of this patent is extended or adjusted under 35 U.S.C. 154(b) by 141 days.

(21) Appl. No.: 12/546,045

(22) Filed: Aug. 24, 2009

(65) Prior Publication Data

US 2011/0047514 A1 Feb. 24, 2011

(51) Int. Cl.
G06F 9/44 (2006.01)
G06F 7/76 (2006.01)

(52) U.S. Cl.
CPC .............. *G06F 9/4446* (2013.01); *G06F 7/766* (2013.01)

(58) Field of Classification Search
CPC ...................................................... G06F 7/766
USPC .................................. 715/841, 862, 705–715
See application file for complete search history.

(56) References Cited

U.S. PATENT DOCUMENTS

| | | | |
|---|---|---|---|
| 4,622,013 A | 11/1986 | Cerchio | |
| 4,648,062 A | 3/1987 | Johnson | |
| 4,964,077 A | 10/1990 | Eisen | |
| 5,117,496 A | 5/1992 | Stearns | |
| 5,121,497 A | 6/1992 | Kerr | |
| 5,179,654 A | 1/1993 | Richards | |
| 5,252,951 A | 10/1993 | Tannenbaum | |
| 5,261,820 A | 11/1993 | Slye | |
| 5,287,448 A | 2/1994 | Nicol | |
| 5,388,993 A | 2/1995 | McKiel | |
| 5,395,243 A | 3/1995 | Lubin | |
| 5,432,940 A | 7/1995 | Potts | |
| 5,475,843 A | 12/1995 | Halviatti | |
| 5,481,667 A | 1/1996 | Bieniek | |
| 5,488,685 A | 1/1996 | Palmer et al. | |
| 5,546,521 A | 8/1996 | Martinez | |
| 5,577,186 A | 11/1996 | Mann | |
| 5,581,684 A | 12/1996 | Dudzik | |
| 5,602,982 A | 2/1997 | Judd | |
| 5,627,958 A | 5/1997 | Potts | |
| 5,640,537 A | 6/1997 | Jessen | |
| 5,680,617 A | 10/1997 | Gough | |

(Continued)

FOREIGN PATENT DOCUMENTS

| CA | 2272208 B2 | 11/1999 |
|---|---|---|
| EP | 0690426 B2 | 8/1999 |

(Continued)

OTHER PUBLICATIONS

Author Unknown, "SHO Player User Guide," [online] [retrieved Sep. 7, 2011]. Retrieved from the Internet: <URL:http://www.transcensus.com/player_userguide/sho_player_userguide_5.htm>.

(Continued)

*Primary Examiner* — William Titcomb
(74) *Attorney, Agent, or Firm* — Vladimir Sherman; Professional Patent Solutions

(57) ABSTRACT

A method for recording a display-independent computerized guidance script, the method comprising capturing a screenshot of a GUI of a computerized application, analyzing an area, in the screenshot, surrounding a determined cursor position, to identify a GUI control, recording a manual operation sequence of the computerized application, and assigning the GUI control to a step of the operation sequence.

19 Claims, 5 Drawing Sheets

(56) References Cited

U.S. PATENT DOCUMENTS

| | | | |
|---|---|---|---|
| 5,745,738 A | 4/1998 | Ricard | |
| 5,748,805 A | 5/1998 | Withgott | |
| 5,790,117 A | 8/1998 | Halviatti | |
| 5,825,356 A | 10/1998 | Habib | |
| 5,867,386 A | 2/1999 | Hoffberg | |
| 5,867,678 A | 2/1999 | Amro | |
| 6,020,886 A | 2/2000 | Jacober | |
| 6,252,594 B1 | 6/2001 | Xia | |
| 6,307,544 B1 | 10/2001 | Harding | |
| 6,308,042 B1 | 10/2001 | Marsh | |
| 6,339,436 B1 | 1/2002 | Amro | |
| 6,340,977 B1 | 1/2002 | Lui | |
| 6,434,532 B2 * | 8/2002 | Goldband et al. | 705/7.25 |
| 6,438,545 B1 | 8/2002 | Beauregard | |
| 6,453,254 B1 | 9/2002 | Bullwinkel | |
| 6,563,514 B1 | 5/2003 | Samar | |
| 6,662,340 B2 | 12/2003 | Rawat | |
| 6,687,485 B2 | 2/2004 | Hopkins | |
| 6,690,390 B1 | 2/2004 | Walters | |
| 6,842,877 B2 | 1/2005 | Robarts | |
| 6,937,257 B1 | 8/2005 | Dunlavey | |
| 7,024,633 B1 | 4/2006 | Mann | |
| 7,159,188 B2 | 1/2007 | Stabb | |
| 7,262,778 B1 * | 8/2007 | Edwards et al. | 345/589 |
| 7,441,250 B2 | 10/2008 | Katz | |
| 7,490,292 B2 | 2/2009 | Hennum | |
| 7,543,278 B2 | 6/2009 | Klementiev | |
| 7,546,602 B2 | 6/2009 | Hejlsberg et al. | |
| 7,620,895 B2 | 11/2009 | Adkins | |
| 7,675,529 B1 | 3/2010 | Brunner | |
| 7,861,178 B2 * | 12/2010 | Lui et al. | 715/762 |
| 7,890,865 B2 * | 2/2011 | Palmer et al. | 715/715 |
| 7,930,643 B2 * | 4/2011 | Chandhoke et al. | 715/771 |
| 7,987,427 B1 * | 7/2011 | Gough et al. | 715/762 |
| 8,205,168 B1 | 6/2012 | Van Slembrouck | |
| 2002/0083422 A1 | 6/2002 | Scouten | |
| 2002/0091993 A1 | 7/2002 | Walley | |
| 2002/0186252 A1 | 12/2002 | Himmel | |
| 2003/0001875 A1 | 1/2003 | Black | |
| 2003/0046082 A1 | 3/2003 | Siegel | |
| 2003/0084115 A1 | 5/2003 | Wood | |
| 2003/0142123 A1 | 7/2003 | Malamud | |
| 2003/0163801 A1 | 8/2003 | Thames | |
| 2003/0171926 A1 | 9/2003 | Suresh | |
| 2003/0210260 A1 * | 11/2003 | Palmer et al. | 345/715 |
| 2003/0219707 A1 | 11/2003 | Hopkins | |
| 2004/0143814 A1 | 7/2004 | De Jong | |
| 2004/0258298 A1 | 12/2004 | Chen | |
| 2005/0050470 A1 | 3/2005 | Hudson et al. | |
| 2005/0080588 A1 | 4/2005 | Kobayashi | |
| 2005/0091612 A1 | 4/2005 | Stabb | |
| 2005/0172018 A1 | 8/2005 | Devine et al. | |
| 2006/0005132 A1 | 1/2006 | Herdeg, III | |
| 2006/0080607 A1 | 4/2006 | Cohen | |
| 2006/0095860 A1 | 5/2006 | Wada | |
| 2006/0168548 A1 | 7/2006 | Kelley | |
| 2006/0177136 A1 | 8/2006 | Windl | |
| 2006/0184880 A1 * | 8/2006 | Bala | 715/705 |
| 2007/0122789 A1 | 5/2007 | Yoo | |
| 2007/0266321 A1 | 11/2007 | Bicker | |
| 2008/0034288 A1 | 2/2008 | Landar | |
| 2008/0086700 A1 | 4/2008 | Rodriguez | |
| 2008/0097984 A1 | 4/2008 | Candelore | |
| 2008/0109722 A1 | 5/2008 | Gengler | |
| 2008/0177994 A1 | 7/2008 | Mayer | |
| 2008/0189612 A1 | 8/2008 | Zhang | |
| 2008/0195958 A1 | 8/2008 | Detiege | |
| 2008/0215976 A1 * | 9/2008 | Bierner et al. | 715/708 |
| 2008/0226119 A1 | 9/2008 | Candelore | |
| 2008/0235339 A1 | 9/2008 | Lurey | |
| 2009/0006985 A1 | 1/2009 | Fong | |
| 2009/0322790 A1 | 12/2009 | Behar | |
| 2010/0064238 A1 | 3/2010 | Ludwig | |
| 2010/0070448 A1 | 3/2010 | Omoigui | |
| 2010/0161586 A1 | 6/2010 | Safar | |
| 2010/0175021 A1 | 7/2010 | Ferrara | |
| 2010/0205530 A1 | 8/2010 | Butin | |
| 2010/0325540 A1 * | 12/2010 | Biazetti et al. | 715/708 |
| 2011/0047462 A1 | 2/2011 | Butin | |
| 2011/0047514 A1 | 2/2011 | Butin | |
| 2012/0005611 A1 * | 1/2012 | Wey et al. | 715/771 |

FOREIGN PATENT DOCUMENTS

| | | |
|---|---|---|
| GB | 2337612 B2 | 11/1999 |
| WO | 2007008503 A2 | 6/2006 |
| WO | 2007/055610 A1 | 5/2007 |
| WO | 2007/085603 | 8/2007 |

OTHER PUBLICATIONS

Final rejection of U.S. Appl. No. 12/546,048 dated Jul. 17, 2012.
Bit Order, captured by the Internet Archive Wayback Machine on Feb. 16, 2005, retrieved Jan. 2012 from http:// web.archive.org/web/20050216154839/http://www.fileformat.info/mirror/egff/ch06_04.htm, pp. 1-3.
Definition of platform webopedia.pdf, captured by the Internet Archive Wayback Machine on Jun. 15, 2007, retrieved Jul. 16, 2013 from http://web. Archive.org/web/20070615144951/http://www.webopedia.com/TERM/P/PLATFORM.html on Jul. 16, 2013, p. 1.
Wikipedia cloud computing.pdf, captured by the Internet Archive Wayback Machine on Jan. 7, 2009, retrieved from http://web.archive.org/web/20090107214626/http://en.wikipedia.org/wiki/Cloud_Computing-html on Jul. 16, 2013 pp. 1,5.

* cited by examiner

RECORDING DISPLAY-INDEPENDENT COMPUTERIZED GUIDANCE

FIELD OF THE INVENTION

Embodiments of the disclosure relate to recording of display-independent computerized guidance.

BACKGROUND OF THE INVENTION

A Personal Computer (PC) or a mobile device (such as a notebook computer, a Personal Digital Assistant (PDA) device, a cellular phone and/or the like) allows users to utilize various applications, for example, word processing applications, spreadsheet applications, e-mail applications, games and the like. These applications may be able to perform various operations based on the user's command, for example, editing, calculating, formatting, file handling, data sorting, and/or the like.

A Graphical User Interface (GUI) of an application usually includes various controls (sometimes also referred to as "widgets") that operate different functions of the application. Such controls may include, for example, icons, texts, buttons, input boxes, menus, drop-down lists, sliders, scroll bars, bars and/or any other operable visual element. In various mobile devices, a control may also be embodied in a physical button and not in the GUI of the application itself. For example, a certain button may be used to perform a specific function in an application.

As applications become more and more complex and sophisticated and thus include many different controls, some users find it useful to attend a course or seminar which teaches users how to use one or more applications. Some users require assistance from other users (such as co-workers, customer support representatives and/or the like) in order to be able to complete particular tasks using an application. Furthermore, it may be difficult for the user to find out, or to remember, whether or not an application is capable of performing a particular task, or which sequence of user-initiated steps is required in order to execute a particular task.

Some applications include a "help" function, in which the user may utilize an index of pre-defined topics, or a search based on user-entered keywords, in order to retrieve pre-defined textual and/or visual descriptions which may assist the user in finding how a particular task is performed. Additionally, some applications are associated with a user's manual, or with a batch of Frequently Asked Questions (FAQ), which may further guide the user on how to perform particular tasks.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

There is provided, in accordance with an embodiment, a method for recording a display-independent computerized guidance script, the method comprising: capturing a screenshot of a graphical user interface (GUI) of a computerized application; analyzing an area, in the screenshot, surrounding a determined cursor position, to identify a GUI control; and recording an operation sequence of the computerized application, and assigning the GUI control to a step of the operation sequence.

There is further provided, in accordance with an embodiment, a recording engine for a display-independent, computerized guidance script, the recording engine comprising: a screenshot capture engine for capturing an image of at least an area surrounding a determined cursor position; a screenshot analysis engine for identifying a GUI control in said area; and an operation sequence recorder for storing an image of said GUI control and assigning said image to a step of said operation sequence.

In some embodiments, the operation sequence is performed manually.

In some embodiments, the operation sequence is performed automatically.

In some embodiments, the method further comprises storing an image of the area surrounding the determined cursor position.

In some embodiments, the method further comprises storing an image of the GUI control.

In some embodiments, the determined cursor position is where a user cursor click is detected.

In some embodiments, the method further comprises converting the screenshot to a 1-bit version.

In some embodiments, the method further comprises converting the screenshot to an inverted 1-bit version.

In some embodiments, the operation sequence comprises a cursor click on the GUI control.

In some embodiments, the operation sequence comprises keyboard input into the GUI control.

In some embodiments, the operation sequence comprises activation of a scroll bar for scrolling to a previously-invisible region of the computerized application.

In some embodiments, said screenshot analysis engine is adapted to convert a screenshot captured by said screen capture engine to a 1-bit version.

In some embodiments, said screenshot analysis engine is adapted to convert a screenshot captured by said screen capture engine to an inverted 1-bit version.

In some embodiments, said operation sequence recorder is adapted to record a cursor click on a GUI control.

In some embodiments, said operation sequence recorder is adapted to record keyboard input into a GUI control.

In some embodiments, said image of said GUI control comprises an image of said GUI control and of an area surrounding said GUI control.

In some embodiments, said GUI control is selected from a group consisting of: an icon, a text, a button, an input box, a menu, a drop-down list, a slider and a bar.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. It is intended that the embodiments and figures disclosed herein are to be considered illustrative rather than restrictive. The figures are listed below.

DETAILED DESCRIPTION OF THE PREFERRED EMBODIMENT

Figure 1:
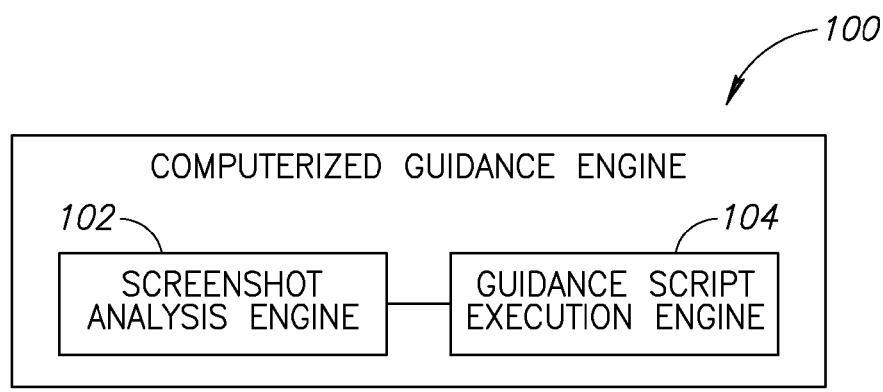
FIG. 1 shows a block diagram of a computerized guidance engine.

An aspect of some embodiments relates to a guidance engine adapted to provide guidance to a user of a computerized application. The guidance may be performed by executing a guidance script capable of actually operating the application by way of, for example, activating one or more controls of the application. For instance, the guidance script may imitate cursor moves, cursor clicks or double-clicks, keyboard strokes, combination of cursor clicks and keyboard strokes and/or the like in lieu of the user. The term "imitate", as referred to herein, may refer to an initiation of an action in the computerized application without actually receiving manual input from an input device such as a mouse, a keyboard, a touch screen and/or the like.

Furthermore, the guidance may be provided to the user in a manner independent of various display properties of the application and/or of the computerized device used by the user (this manner hereinafter referred to as "display-independent"). Since an application may be run with different display properties, such as window size, resolution, color, fonts, themes and/or the like, a conventional guidance script which was recorded with one set of display properties may encounter difficulties operating an application which uses a different set of display properties. This may happen, for example, because a certain GUI control operable by the conventional guidance script may appear in a new, unrecognized location and/or form in the actual application on which the script is finally run. The conventional script may therefore simply fail to identify and operate that control.

Accordingly, the present guidance engine may include a screenshot analysis engine for analyzing the GUI of the application, thereby matching at least one control present in the GUI with a corresponding control of a pre-recorded guidance script. Then, a guidance script execution engine may be able to execute the script and operate the necessary control—independent of the display properties of the application on which the script is executed.

An aspect of additional embodiments relates to a recording engine and a method thereof, for recording a display-independent, computerized guidance script. The recording engine may, in addition to recording a sequence of operations in an application, capture and analyze a screenshot of the application's GUI. In the analysis, the recording engine may inspect an area surrounding a determined cursor position, such as a position where a GUI control was activated by the user performing a sequence of operations. The activated GUI control may then be identified, and an image of it and/or metadata associated with it may then be assigned to the respective step of the operation sequence.

An additional aspect relates to a display-independent, GUI control recognizer and a method thereof. The GUI control recognizer may be capable of recognizing and identifying a GUI control in a screenshot of a user interface of an application. The use of the GUI control recognizer may or may not be tied to execution and/or recording of a guidance script. For example, recognition of GUI controls may be used as general-purpose image recognition method, to complement other computerized operations as desired.

Display-Independent Computerized Guidance

Reference is now made to FIG. 1, which shows a block diagram of a computerized guidance engine (hereinafter "guidance engine") 100, according to an embodiment. Guidance engine 100 may be a software product installed on and/or adapted to be run on a computerized device, such as a Personal Computer (PC), a desktop computer, a mobile computer, a laptop computer, a notebook computer, a tablet computer, a server computer, a handheld computer, a handheld device, a mobile game console, an essentially stationary game console, a Personal Digital Assistant (PDA) device, an on-board device, an off-board device, a cellular phone, a hybrid device (for example a device incorporating functionalities of multiple types of devices, such as PDA functionality and cellular phone functionality), a vehicular device, a non-vehicular device, a mobile or portable device, a non-mobile or non-portable device and/or the like.

Figure 2:
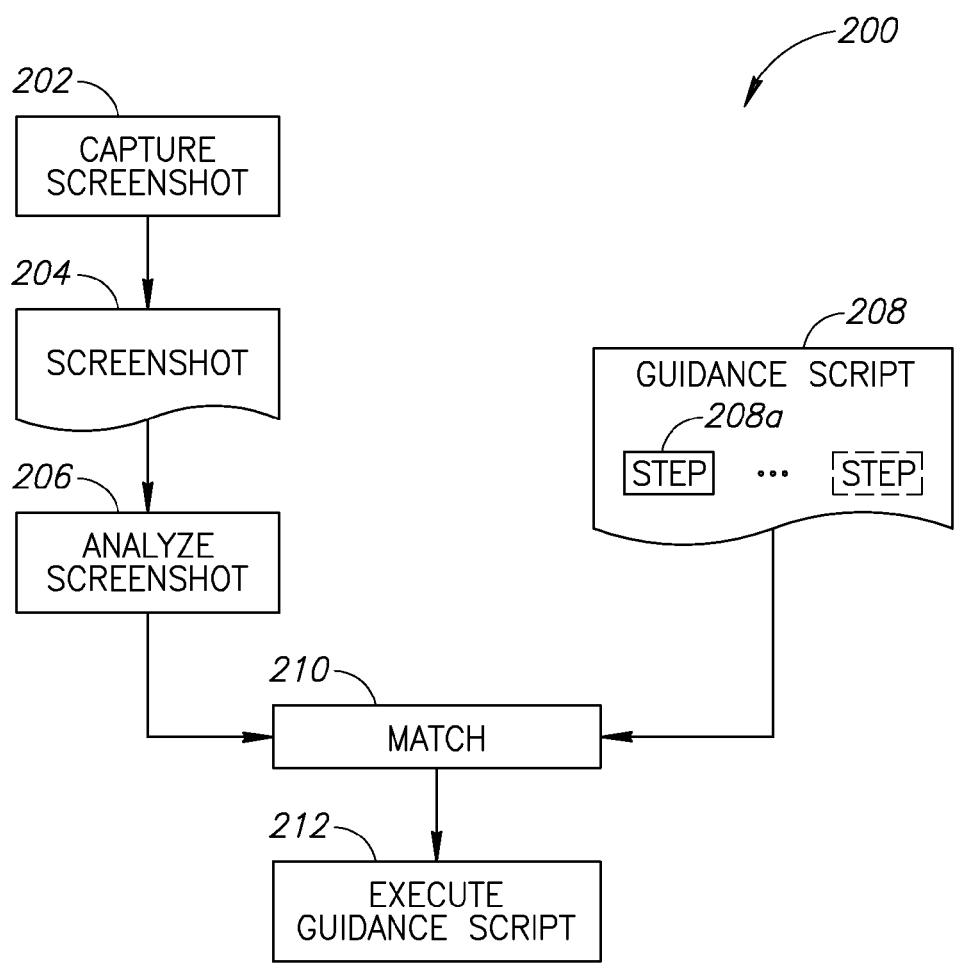
FIG. 2 shows a flow chart of a method for display-independent execution of a computerized guidance script.

Guidance engine 100 optionally includes a screenshot analysis engine 102 and a guidance script execution engine 104, each being a software component and/or module or both being implemented as a single component and/or module. FIG. 2 shows a flow chart of a method 200 (or an "algorithm") for display-independent execution of a computerized guidance script; operation of guidance engine 100 of FIG. 1 shall now be described through an explanation of method 200 of FIG. 2.

In a block 202, a screenshot 204 of a GUI of a computerized application is captured, such as using screenshot analysis engine 102 (FIG. 1) or a screenshot capture engine (not shown). This may be performed in response to a user request for guidance, made by, for example, pressing a key assigned to activation of guidance engine 100 (FIG. 1), clicking on an icon of the guidance engine, selecting from a list of available guidance scripts, searching for and retrieving a desired guidance script, and/or the like. Alternatively, activity of the user may be tracked, to automatically determine if the user is experiencing difficulties with the operation of the application. If such a difficulty is identified, processing of method 200 may begin, in order to proactively provide the user with guidance as to the operation in which difficulties were encountered.

The capturing may include storing screenshot 204 as an image, whether in a temporary memory or in a permanent, non-volatile memory. Reference is now parenthetically made to FIG. 3, which shows a GUI 300 of an illustrative computerized application, such as a word processing application. In block 200 of FIG. 1, GUI 300, fully or partially, may be stored as in image. A GUI, such as GUI 300, may include one or more controls (sometimes also referred to as "widgets") that operate different functions of the application. Such controls may include, for example, icons (such as an icon 302), texts (such as a text 304), buttons (such as a "bold" button 306), input boxes (such as a "font" input box 308 and text area 310), menus, drop-down lists (such as a "font" drop-down list 312), scroll bars (such as a vertical scroll bar 314 and a horizontal scroll bar 316), sliders, bars and/or any other operable visual element.

A different GUI (not shown) may include a user interface of what is often referred to as a "console application" (also "command line", "command prompt", "text terminal", "terminal" and/or the like). A console application may be a software application having a user interface composed mainly of text, and sometimes with the addition of some simple, minimalistic graphic elements and/or symbols. Console applications are usually designed for operation using a keyboard, although sometimes they may also be controlled using a pointing device such as a mouse. Due to their lack of extensive graphic elements, their GUI is often referred to simply as a "user interface" (UI), without the word "graphical". However, the term GUI, as referred to herein, is intended to include also a UI of a console application.

Back to FIG. 2, a guidance script 208 may be provided. Guidance script 208 may include an executable operation sequence for operating the application. The operation sequence may include one or more step(s) 208a, each step optionally containing an action pertaining to a GUI control (sometimes referred to simply as a "control") of the application. With reference to GUI 300 of FIG. 3, as a mere example, a first step may include imitating a click on a "tab 1" control 320, a second step may include imitating a click on a "bold" control 306, a third step may include imitating a click on a "tab 2" control 322, and a fourth step may include imitating text typing inside "text area" control 310. Images of one or more GUI controls associated with actions of guidance script 208, such as controls 320, 306, 322 and 310 of FIG. 3, may be provided with the guidance script.

Screenshot 204 may be analyzed in a block 206, for identifying in it a control corresponding to a control of guidance script 208. The analysis may be performed, for example, using screenshot analysis engine 102 (FIG. 1). It may be performed on an original screenshot, such as a color screenshot, and/or on one or more modified screenshots, such as resized screenshots, portions of screenshots, grey-scaled screenshots or black-and-white (1-bit) versions of screenshots, inverted versions of screenshots or of grey-scaled screenshots or of black-and-white versions of screenshots, and/or the like. A modified screenshot may be produced using an image conversion module, a software component adapted to perform the required modification by way of image processing.

The analysis of screenshot 204 may include running an image recognition algorithm adapted to identify graphical and/or textual characteristics of a control in the screenshot, to enable a matching 210 of the control with a corresponding control of a step 208a of guidance script 208. Graphical characteristics of a control may include visible external borderlines of the control. A simple case is when a control has a noticeable borderline. For example, in FIG. 3, a "paste" button 318 can be relatively easily distinguished from its surroundings, since its most peripheral areas include a continuous frame made of connected pixels. Sometimes, a text is associated with a graphical control, such as the word "text" 304 which appears below "paste" button 318 and is associated with it. The algorithm may identify "text" 304 and "paste" button 318 as associated, based on a pre-determined space between them that indicates their association. The space may range, for example, from 1 pixel to several or even dozens of pixels, depending on the situation. The algorithm may further determine if a text is associated with a graphical control by assigning different "weights" to texts based on their position relative to the graphical control. For example, text positioned on the right or left sides of the graphical control may be given a high weight, text positioned above the graphical control may be given a medium weight, and text positioned below the graphical control may be given a low weight. The higher the weight, the more likely it is that the text is associated with the graphical control.

Textual characteristics may be identified Optical Character Recognition (OCR) techniques, such as by locating "islands" of connected pixels, each island typically defining a single character (such as a letter, a number or a symbol); in some cases, such as the case of the letters "i" and "j", each letter may be defined by two islands, while in further cases, any suitable character may be defined by multiple islands. A whole word may be identified by determining a series of characters positioned adjacently, where a space which follows a letter and which has the width of approximately one or two characters, may indicate a separation between two words. If the space is wider than a pre-determined value, it may indicate that the next word is not associated with the previous word or words, and is part of a separate control.

In the case of a console application UI, it is likely that OCR techniques will be more prevalent than determination of graphical characteristics of elements. That is, as mentioned, console applications usually include mainly text, and OCR techniques may be more suitable for analyzing console application UI in order to identify one or more controls in them.

Following the identification of a control in screenshot 204, it may be matched 210 with a control of guidance script 208, to enable guidance script execution engine 104 (FIG. 1) to successfully execute 212 the guidance script and operate the actual control in the application, such as by clicking on it, by initiating a keyboard stroke or combination that trigger the control, and/or the like. However, in some scenarios, there may exist multiple controls in the application's GUI that look essentially the same. In such scenarios, in order to correctly match one of these GUI controls with the correct control of guidance script 208, it may be necessary to analyze also the surroundings of the control (such as its adjacent controls and/or adjacent graphical elements), both in screenshot 204 and in guidance script 208, so at to increase the chances of a correct matching. Matching controls are often likely to have similar surrounding controls and/or graphical elements.

In an embodiment, it may be possible to pre-define an accuracy level at which the matching is performed. A higher accuracy level is likely to be less tolerant to extreme changes in display properties between screenshot 204 and guidance script 208, whereas a lower accuracy level may still allow matching under display property changes—but may also cause matching mistakes. Optionally, the accuracy level is defined in percentages.

In case the matching is unsuccessful, namely—no corresponding controls of screenshot 204 and guidance script 208 are found, screenshot analysis engine 102 (FIG. 1) may be utilized for automatically activating one or more scroll bars, such as horizontal scroll bar 316 (FIG. 3) and/or vertical scroll bar 314 (FIG. 3), for scrolling to a previously-invisible region of the computerized application. For example, screenshot analysis engine 102 (FIG. 1) may automatically scroll to previously-invisible regions of text area (FIG. 3) for searching for a GUI control which may be a match for a control of guidance script 208. Optionally, after the scrolling uncovers a new region, a screenshot of the GUI may be captured 202 again, and the analysis 206 and matching 210 steps may be repeated for the new region.

Figure 3:
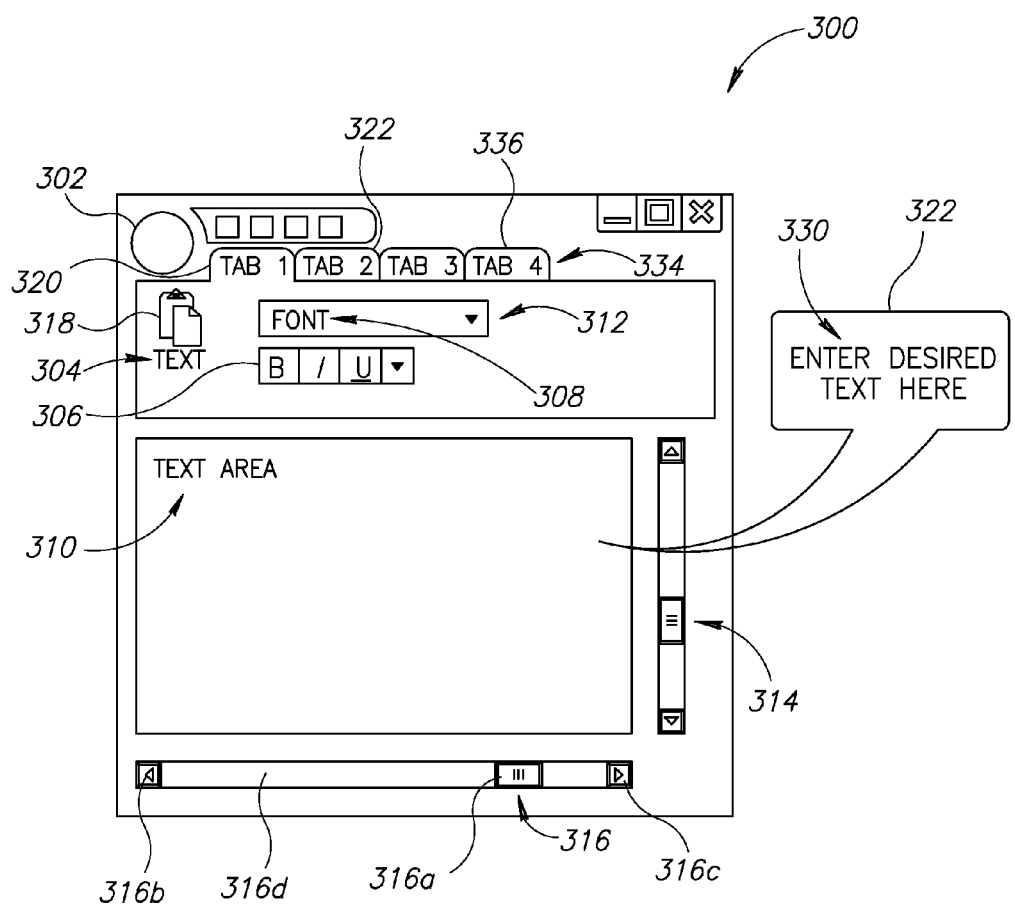
FIG. 3 shows a Graphical User Interface (GUI) of an illustrative computerized application.

During the execution, in block 212, of guidance script 208, one or more help texts may be displayed in order to complement at least one of step(s) 208a with explanations to the user. For example, the execution may be performed in a semi-automatic mode, in which, following an automatic activation of a control, a help text is displayed, asking the user to perform a manual operation. Reference is now made back to FIG. 3, in which an exemplary help text 330 is shown inside an exemplary guide bubble 332. Help text 330 requests the user to enter text into text area 310. After the user enters the text, guidance script 208 (FIG. 2) may proceed to a next step. Guidance script execution engine 104 of FIG. 1 may be adapted to automatically detect when the user finished performing the manual operation. Additionally or alternatively, the user may be presented with a button (not shown), for example, on which he clicks to indicate to guidance script execution engine 104 of FIG. 1 that he completed the manual operation and wishes to resume execution of the guidance script.

Recording a Display-Independent Computerized Guidance Script

Figure 4:
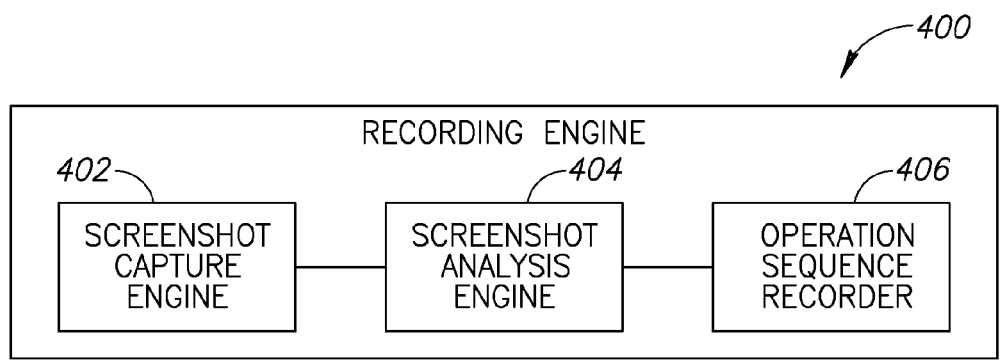
FIG. 4 shows a block diagram of a recording engine for a display-independent, computerized guidance script.

Reference is now made to FIG. 4, which shows a block diagram of a recording engine 400 for a display-independent, computerized guidance script, according to an embodiment.

Recording engine 400 may be a software product installed on and/or adapted to be run on a computerized device, such as a Personal Computer (PC), a desktop computer, a mobile computer, a laptop computer, a notebook computer, a tablet computer, a server computer, a handheld computer, a handheld device, a mobile game console, an essentially stationary game console, a Personal Digital Assistant (PDA) device, an on-board device, an off-board device, a cellular phone, a hybrid device (for example a device incorporating functionalities of multiple types of devices, such as PDA functionality and cellular phone functionality), a vehicular device, a non-vehicular device, a mobile or portable device, a non-mobile or non-portable device and/or the like.

Recording engine 400 may be used for recording a guidance script, such as guidance script 208 of FIG. 2, where the guidance script is adapted to be later run on the same or a different computerized device. For example, a software developer or a software developing company may record a guidance script and distribute it to users for running on their computerized devices.

Figure 5:
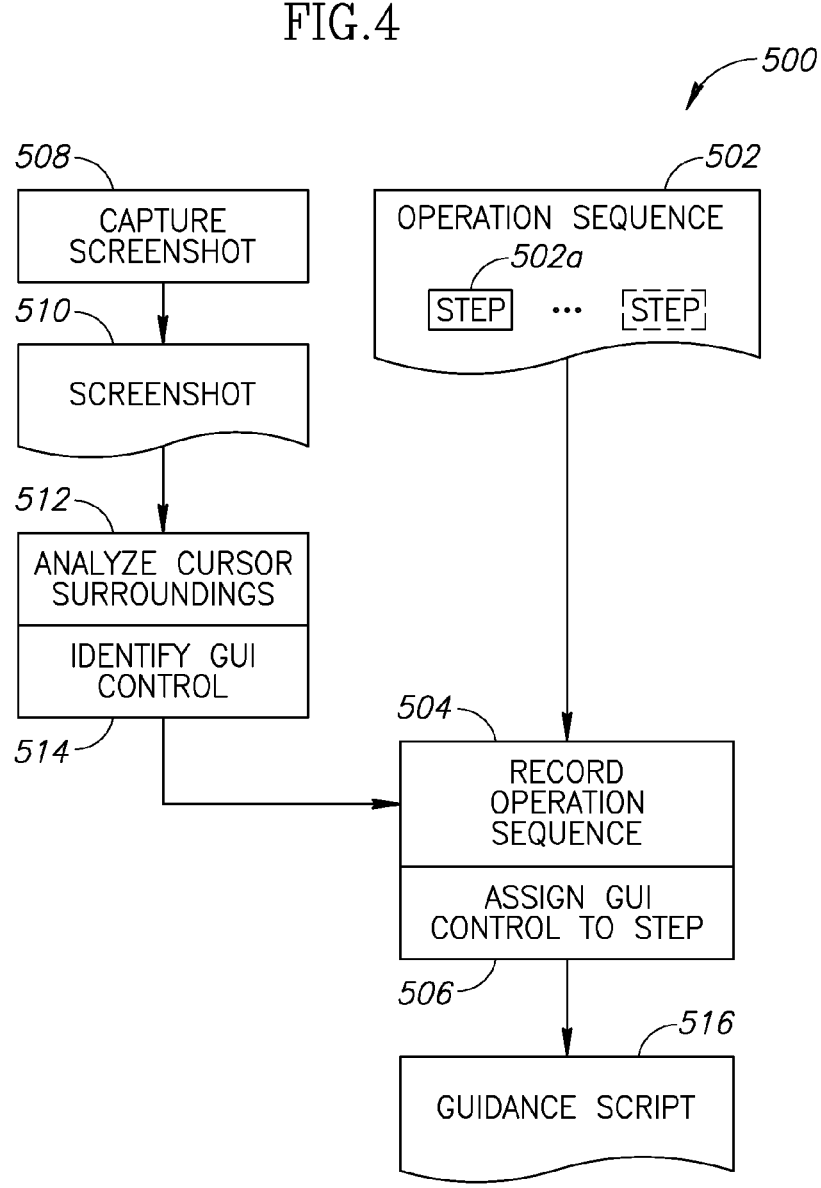
FIG. 5 shows a flow chart of a method for recording a display-independent, computerized guidance script.

Recording engine 400 optionally includes a screenshot capture engine 402, a screenshot analysis engine 404, and/or an operation sequence recorder 406, each being a software component and/or module or all being implemented as a single component and/or module. FIG. 5 shows a flow chart of a method 500 (or an "algorithm") for recording a display-independent, computerized guidance script; operation of recording engine 400 of FIG. 4 shall now be described through an explanation of method 500 of FIG. 5.

At an overview of method 500, an operation sequence in the computerized application is manually performed by a user in a block 502. The operation sequence may include one or more step(s) 502a, each step optionally containing an action pertaining to a GUI control of the application. With reference to GUI 300 of FIG. 3, as a mere example, a first step may include manually clicking on a "tab 1" control 320, a second step may include manually clicking on a "bold" control 306, a third step may include manually clicking on a "tab 2" control 322, and a fourth step may include manually typing text inside "text area" control 310.

In a block 504, the operation sequence may be recorded, such as using operation sequence recorder 406 of FIG. 4. The recording may include a recording of actions such as a cursor click, a cursor move path, a keyboard input and/or the like. These actions may be performed either manually (by a user) or automatically, using software adapted to execute actions in the computerized application. Usage of such software may enable faster, more accurate and/or more efficient recording of an operation sequence, without the need for substantial human intervention. During the recording, one or more controls may be assigned, in a block 506, to their respective steps 502a. A guidance script including a recorded operation sequence and a control assigned to each step is produced in a block 516.

The recording of the operation sequence in block 504 and the assigning of each control to a step in block 506, may be performed based on actions on blocks 508-514, as set forth herein:

In a block 508, a screenshot 510 of a GUI of a computerized application is captured, such as using screenshot capture engine 402 (FIG. 4). The capturing may be performed responsive to step 502a, such as following a cursor click, a keyboard input and/or the like by the user.

A position at which a cursor was at when performing the click, may be identified in screenshot 510. For example, with reference to FIG. 3, a cursor 334 is shown positioned next to and clicking on a "tab 4" text 336. Similarly, if a keyboard stroke is the manual operation by the user, a position of a control activated by the stroke may be detected. For example, if the keyboard combination ctrl+4 activates "tab 4" 336, the position of "tab 4" is detected and assumed.

In a block 512, an area surrounding the determined cursor position is analyzed, such as by screenshot analysis engine 404 of FIG. 4. The analysis may enable identification 514 of a control on which the cursor click was performed or which the keyboard stroke activated. Optionally, screenshot analysis engine 404 of FIG. 4 operates similar to screenshot analysis engine 102 FIG. 1. Accordingly, the analysis of block 512 is performed similar to the analysis of block 206 of FIG. 2, as described above.

The identified control and/or its surrounding area may be saved as an image, and, as mentioned above, assigned 506 to step 502a of operation sequence 502 and optionally stored together with guidance script 516.

To summarize method 500, it is capable of producing guidance script 516 which is display-independent, namely—due to the storing of an image together with each step 502a, it is later possible to execute the guidance script on a computerized device having different display properties that the computerized device of which the recording of method 500 is done. That is, the stored image may be matched, during the execution, with an identified control of the GUI of the computerized application on which the guidance script is executed.

Display-Independent Recognition of a GUI Control

Figure 6:
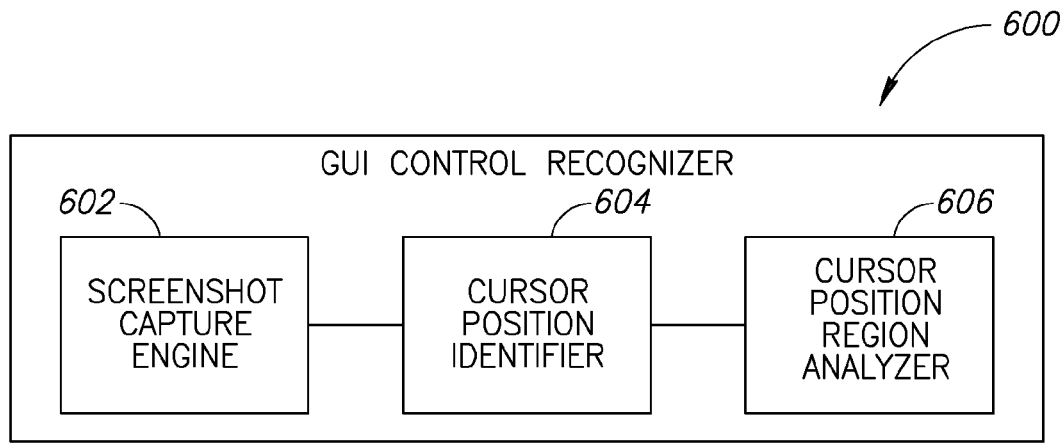
FIG. 6 shows a block diagram of a display-independent, GUI control recognizer.

Reference is now made to FIG. 6, which shows a block diagram of a display-independent, GUI control recognizer 600, according to an embodiment.

Control recognizer 600 may be a software product installed on and/or adapted to be run on a computerized device, such as a Personal Computer (PC), a desktop computer, a mobile computer, a laptop computer, a notebook computer, a tablet computer, a server computer, a handheld computer, a handheld device, a mobile game console, an essentially stationary game console, a Personal Digital Assistant (PDA) device, an on-board device, an off-board device, a cellular phone, a hybrid device (for example a device incorporating functionalities of multiple types of devices, such as PDA functionality and cellular phone functionality), a vehicular device, a non-vehicular device, a mobile or portable device, a non-mobile or non-portable device and/or the like.

Control recognizer 600 may be used for recognizing and identifying a GUI control in a screenshot of a GUI of a computerized application. The use of control recognizer 600 may or may not be tied to execution and/or recording of a guidance script, as set forth above. For example, recognition of GUI controls may be used as general-purpose image recognition method, to complement other computerized operations as desired.

Figure 7:
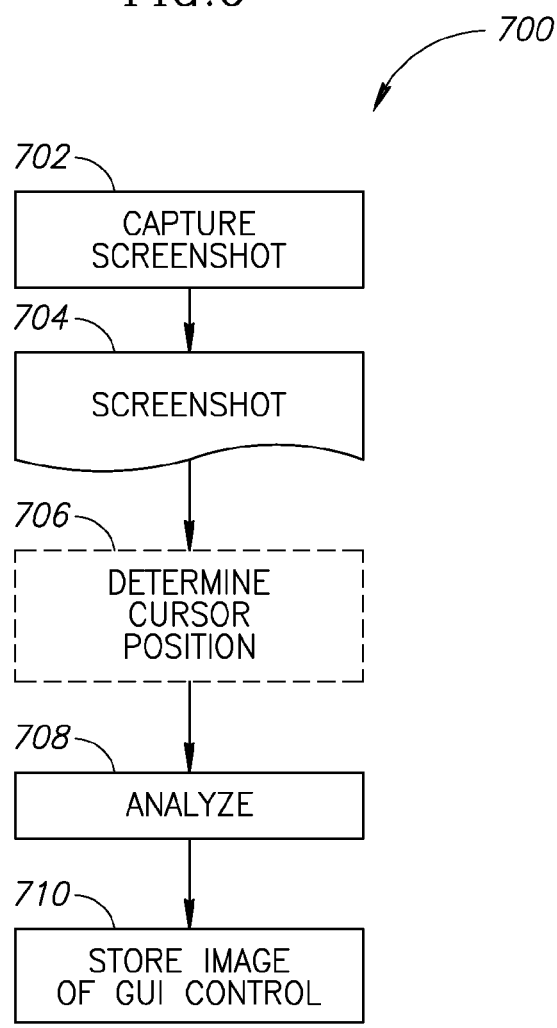
FIG. 7 shows a flow chart of a method for display-independent recognition of a GUI control.

Control recognizer 600 optionally includes a screenshot capture engine 602, a cursor position identifier 604 and/or a cursor position region analyzer 606, each being a software component and/or module or all being implemented as a single component and/or module. FIG. 7 shows a flow chart of a method 700 (or an "algorithm") for display-independent recognition of a GUI control; operation of control recognizer 600 of FIG. 6 shall now be described through an explanation of method 700 of FIG. 7.

In a block 702, a screenshot 704 of a GUI of a computerized application is captured, such as using screenshot capture engine 602 (FIG. 6). The capturing is optionally performed during an operation sequence performed by a user, namely, responsive to a cursor click, a keyboard input and/or the like by the user.

In an optional block 706, a position at which a cursor was at when performing the click, if such a click was indeed performed, may be determined. This may be performed by cursor position identifier 604 of FIG. 6. For example, with reference to FIG. 3, a cursor 334 is shown positioned next to and clicking on a "tab 4" text 336. Similarly, if a keyboard stroke was performed by the user, then a position of a control activated by the stroke may be detected. For example, if the keyboard combination ctrl+4 activates "tab 4" 336, the position of "tab 4" is detected and assumed.

In a block 708, if actions of optional block 706 are performed, then an area surrounding the determined cursor position is analyzed, such as by cursor position region analyzer 606 of FIG. 6. The analysis may enable identification of a control on which the cursor click was performed or which the keyboard stroke activated. Optionally, cursor position region analyzer 606 of FIG. 6 operates similar to screenshot analysis engine 102 FIG. 1. Accordingly, the analysis of block 708 is performed similar to the analysis of block 206 of FIG. 2, as described above.

Alternatively, in block 708, if actions of optional block 706 are not performed, then an area of screenshot 704 up to its entirety may be analyzed, such as by cursor position region analyzer 606 of FIG. 6. The analysis may enable identification of one or more controls existing in screenshot 704.

In a block 710, the identified control and/or its surrounding area may be stored as an image. The image of the control may then be used in another computerized process, application and/or the like, as desired. Advantageously, method 700 may enable the analysis of a GUI of a computerized application, in a manner enabling identification and extraction of individual controls from a screenshot of the GUI.

Figure 8:
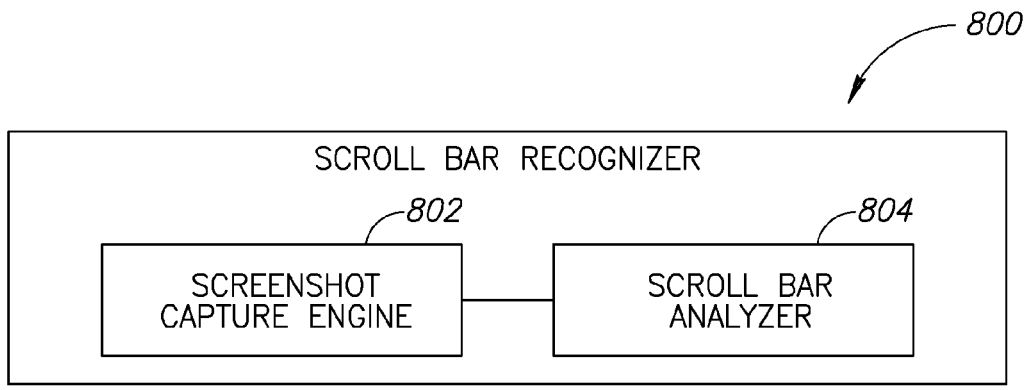
FIG. 8 shows a block diagram of a display-independent, scroll bar recognizer.

Reference is now made to FIG. 8, which shows a block diagram of a display-independent scroll bar recognizer 800.

Scroll bar recognizer 800 may be a software product installed on and/or adapted to be run on a computerized device, such as a Personal Computer (PC), a desktop computer, a mobile computer, a laptop computer, a notebook computer, a tablet computer, a server computer, a handheld computer, a handheld device, a mobile game console, an essentially stationary game console, a Personal Digital Assistant (PDA) device, an on-board device, an off-board device, a cellular phone, a hybrid device (for example a device incorporating functionalities of multiple types of devices, such as PDA functionality and cellular phone functionality), a vehicular device, a non-vehicular device, a mobile or portable device, a non-mobile or non-portable device and/or the like.

Scroll bar recognizer 800 may be used for recognizing and identifying a scroll bar in a screenshot of a GUI of a computerized application. The use of scroll bar recognizer 800 may or may not be tied to execution and/or recording of a guidance script, as set forth above. For example, recognition of scroll bars may be used as general-purpose image recognition method, to complement other computerized operations as desired.

Figure 9:
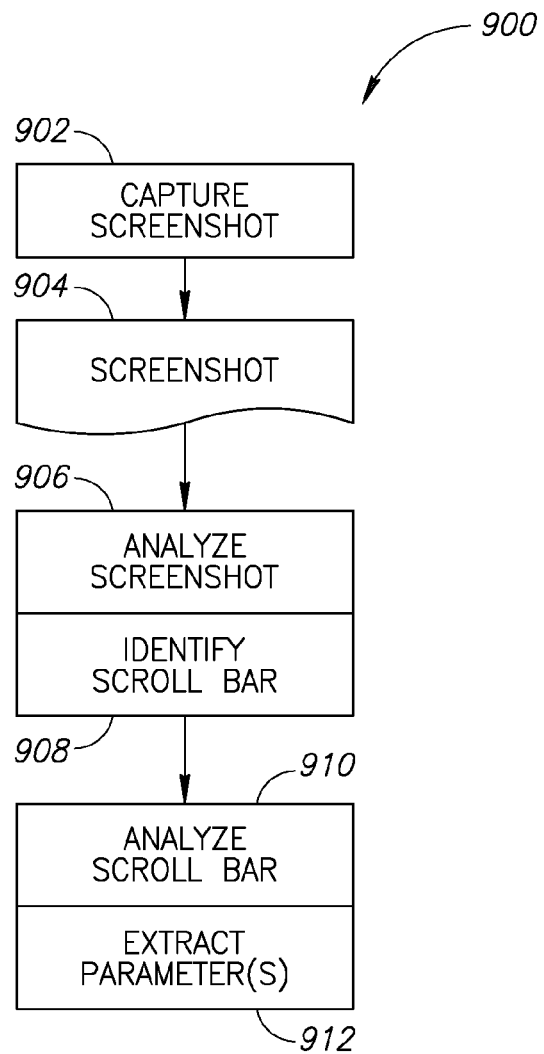
FIG. 9 shows a flow chart of a method for display-independent recognition of a scroll bar.

Scroll bar recognizer 800 optionally includes a screenshot capture engine 802 and a scroll bar analyzer 804, each being a software component and/or module or both being implemented as a single component and/or module. FIG. 9 shows a flow chart of a method 900 (or an "algorithm") for display-independent recognition of a scroll bar; operation of scroll bar recognizer 800 of FIG. 8 shall now be described through an explanation of method 900 of FIG. 9.

In a block 902, a screenshot 904 of a GUI of a computerized application is captured, such as using screenshot capture engine 802 of FIG. 8.

In a block 906, screenshot 904 is analyzed, in order to identify a scroll bar in a block 908. The analysis may be performed by scroll bar analyzer 804 of FIG. 8. The analysis may include a search for a control (namely, the scroll bar) which complies with the common characteristics of a scroll bar, namely—the existence of a thumb, an elongated trough and one or more arrows. These characteristics may be better understood by returning to FIG. 3. Horizontal scroll bar 316, for example, includes a thumb (sometimes referred to as a "bar") 316a, which is optionally an element adapted to be dragged (using a cursor and/or a keyboard) along an elongated trough 316d. The dragging of thumb 316a may cause "scrolling", namely, revelation of previously-invisible areas of text area 310. For example, if thumb 316a is dragged to the right, a previously-invisible right area of text area 310 is revealed. A width (or height, in case of a vertical scroll bar) of thumb 316a is optionally reflective of the degree of zooming applied. A thumb that completely fills a trough indicates that the entire document is being viewed. Alternatively, scrolling may be achieved by clicking on an arrow, such as left arrow 316b or right arrow 316c, of scroll bar 316. Clicking on left arrow 316b, for example, may reveal a previously-invisible left area of text area 310 and may move thumb 316a to the left.

The analysis may include a search for at least two elements of a scroll bar, namely, an arrow and a thumb. Optionally, the search is performed on a 1-bit and/or an inverted 1-bit version of screenshot 904. An arrow may be identified by searching for a continuous island of connected pixels that form a triangular shape. A thumb may be identified by searching in an axis parallel to the pointing direction of the identified arrow. Each element found in that axis may be analyzed, and the existence of a thumb may be determined if an essentially quadrangular island of connected pixels is found. An essentially empty space (represented by an island of connected pixels having the reverse color of the thumb) between the arrow and the thumb may resemble a trough.

Alternatively, the at least two elements searched for may be two arrows of opposing directions, lying on the same axis, which is parallel to their pointing directions.

In a block 910, the identified scroll bar is analyzed, to extract at least one parameter of it in a block 912. The analysis of the scroll bar may include a determination of one or more of the following parameters: a location of the scroll bar, a size of the scroll bar, a location of a thumb of the scroll bar, a size of a thumb of the scroll bar, a size of an arrow of the scroll bar and a location of an arrow of the scroll bar. Each of these sizes may be denoted in pixels, horizontally and/or vertically. Each of these locations may be denoted as X-Y coordinates of the scroll bar, the thumb or the arrow in relation to the entirety of the GUI.

Optionally, following the extraction of the above parameter(s), the scroll bar may be automatically operated for scrolling. For example, its thumb may be dragged and/or its arrows may be clicked for revealing a previously-invisible area of the GUI.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

In the description and claims of the application, each of the words "comprise" "include" and "have", and forms thereof, are not necessarily limited to members in a list with which the words may be associated.

What is claimed is:

1. A method for creating an automated tutorial for demonstrating a use of a given process of a given computer application, the method comprising:
   I. capturing image information representing the demonstration of the given process of the given computer application on a first computer, wherein capturing includes: (a) detecting an activation of a graphical user interface (GUI) control associated with the given process; (b) during or shortly after the activation of the graphical user interface (GUI) control capturing a screenshot of the computerized application and the activated GUI control; (c) automatically analyzing an appearance of the activated GUI control to generate image information usable by a guidance script player to identify the GUI control; and
   II. converting the captured image information into a guidance script which script drives a tutorial player application to provide a tutorial of the demonstration of the given process of the given application on a second computer, wherein converting includes: (a) embedding into a guidance script at least the image information of the activated GUI control and at least an instruction indicating to the script player to: (i) identify a matching GUI control on another instance of the computerized application, and (ii) activate the identified control by automatically driving a mouse pointer or a keyboard cursor to the identified GUI control on the other instance of the computerized application.

2. The method according to claim 1, wherein the generate image information includes text.

3. The method according to claim 1, wherein converting the captured image information into a guidance script further comprises receiving guidance bubble information to be displayed during the tutorial.

4. The method according to claim 1, wherein an appearance of the activated GUI control includes an image of the area surrounding a determined cursor position.

5. The method according to claim 1, wherein said capturing further comprising storing said image information usable by a guidance script player to identify the GUI control.

6. The method according to claim 4, wherein the determined cursor position is where a user cursor click is detected.

7. The method according to claim 1, further comprising converting a screenshot to a 1-bit version.

8. The method according to claim 1, further comprising converting a screenshot to an inverted 1-bit version.

9. The method according to claim 1, wherein activate the identified control comprises a cursor click on the identified GUI control.

10. The method according to claim 1, wherein activate the identified control comprises keyboard input into the identified GUI control.

11. The method according to claim 1, wherein activate the identified control comprises activation of a slider for scrolling to a previously-invisible region of the other instance of the computerized application.

12. The method according to claim 1, wherein the identified GUI control is selected from a group consisting of: an icon, a text, a button, an input box, a menu, a drop-down list, a slider and a bar.

13. An automated tutorial for demonstrating a use of a given process of a given computer application, said automated tutorial, when executed by a computer, causes the computer to:
   I. capture image information representing the demonstration of the given process of the given computer application on a first computer, wherein capture includes: (a) detect an activation of a graphical user interface (GUI) control associated with the given process; (b) during or shortly after the activation of the GUI control capture a screenshot of the computerized application and the activated GUI control; (c) automatically analyze an appearance of the activated GUI control to generate image information usable by a guidance script player to identify the GUI control; and
   II. convert the captured image information into a guidance script, said guidance script to drive a tutorial player application to provide a tutorial of the demonstration of the given process of the given application on a second computer, wherein convert includes: (a) embed into a guidance script at least the image information of the activated GUI control and at least an instruction indicating to the script player to: (i) identify a matching GUI control on another instance of the computerized application and (ii) activate the identified control by automatically driving a mouse pointer or a keyboard cursor to the identified GUI control on the other instance of the computerized application.

14. The automated tutorial according to claim 13, wherein captured image information includes a converted screenshot to a 1-bit version.

15. The automated tutorial according to claim 13, wherein said captured image information further includes a converted screenshot to an inverted 1-bit version.

16. The automated tutorial according to claim 13, wherein said guidance script is adapted to record a cursor click on the identified GUI control.

17. The automated tutorial according to claim 13, wherein said guidance script is adapted to record keyboard input into the identified GUI control.

18. The automated tutorial according to claim 13, wherein appearance of the activated GUI control includes an area surrounding the identified GUI control.

19. The automated tutorial according to claim 13, wherein the identified GUI control is selected from a group consisting of: an icon, a text, a button, an input box, a menu, a drop-down list, a slider and a bar.

* * * * *